United States Patent
Jiang et al.

(10) Patent No.: US 12,058,516 B2
(45) Date of Patent: Aug. 6, 2024

(54) PROTECTED HIGH-THROUGHPUT CONTROL SUBFIELD

(71) Applicant: Apple Inc., Cupertino, CA (US)

(72) Inventors: Jinjing Jiang, San Jose, CA (US); Yong Liu, Campbell, CA (US); Su Khiong Yong, Palo Alto, CA (US); Tianyu Wu, Fremont, CA (US); Jarkko L. Kneckt, Los Gatos, CA (US); Lochan Verma, San Diego, CA (US); Qi Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 17/504,610

(22) Filed: Oct. 19, 2021

(65) Prior Publication Data

US 2022/0132306 A1   Apr. 28, 2022

Related U.S. Application Data

(60) Provisional application No. 63/104,883, filed on Oct. 23, 2020.

(51) Int. Cl.
*H04W 12/037* (2021.01)
*H04W 12/02* (2009.01)
(Continued)

(52) U.S. Cl.
CPC ......... *H04W 12/037* (2021.01); *H04W 12/02* (2013.01); *H04W 12/06* (2013.01); *H04W 84/12* (2013.01)

(58) Field of Classification Search
CPC ... H04W 12/037; H04W 12/02; H04W 12/06; H04W 84/12; H04W 80/02;
(Continued)

(56) References Cited

U.S. PATENT DOCUMENTS 9,843,558 B2   12/2017  Seok
10,178,582 B2 *  1/2019  Asterjadhi ............ H04L 1/1896
(Continued)

FOREIGN PATENT DOCUMENTS

CN   112218291 A *  1/2021

OTHER PUBLICATIONS

Extended European Search Report for EP Patent Application No. 21203932.5; 6 pages; Feb. 24, 2022.
(Continued)

*Primary Examiner* — Ali S Abyaneh
*Assistant Examiner* — Lydia L Noel
(74) *Attorney, Agent, or Firm* — Kowert, Hood, Munyon, Rankin & Goetzel, P.C.

(57) ABSTRACT

During operation, an electronic device may encrypt an A-control subfield. Then, the electronic device may provide the frame addressed to a second electronic device, where the frame includes a media access control (MAC) header and the MAC header includes the A-control subfield that is encrypted. Note that the encrypted A-control subfield may be jointly encrypted with data in a payload in the frame. Moreover, the encrypted A-control subfield may be separated from the payload in the frame by one or more additional subfields or may be adjacent to the payload in the frame. Furthermore, the MAC header may include an indicator that indicates whether the A-control subfield is encrypted. Additionally, the frame may include a preamble that indicates whether the A-control subfield is encrypted. The frame may be received by the second electronic device. After receiving the frame, the second electronic device may decrypt the A-control subfield.

20 Claims, 13 Drawing Sheets

(51) Int. Cl.
*H04W 12/06* (2021.01)
*H04W 84/12* (2009.01)

(58) Field of Classification Search
CPC ............. H04W 12/106; H04L 63/0428; H04L 69/324; H04L 69/22; H04L 69/06
See application file for complete search history.

(56) References Cited

U.S. PATENT DOCUMENTS

| | | |
|---|---|---|
| 10,750,401 B2 | 8/2020 | Kim et al. |
| 2007/0109988 A1* | 5/2007 | Sampath ............... H04L 1/0083 370/321 |
| 2008/0175265 A1* | 7/2008 | Yonge .................... H04L 12/413 370/447 |
| 2008/0273700 A1* | 11/2008 | Wentink ................ H04L 1/1867 380/270 |
| 2013/0173924 A1* | 7/2013 | Sampath ............... H04L 1/0083 370/321 |
| 2016/0174102 A1* | 6/2016 | Asterjadhi ............ H04W 28/06 370/389 |
| 2016/0285834 A1 | 9/2016 | Lee et al. |
| 2018/0176901 A1* | 6/2018 | Huang .................. H04L 1/0008 |
| 2020/0137734 A1* | 4/2020 | Chun ...................... H04L 27/26 |
| 2020/0280975 A1* | 9/2020 | Asterjadhi ............ H04W 28/18 |

OTHER PUBLICATIONS

Qualcomm Inc "HE A-Control field; 11-15-1121-00-00ax-he-a-control-field"; 18 pages; Sep. 14, 2015.

* cited by examiner

| VARIANT | B0 | B1 | B2-B29 | B30 | B31 |
|---|---|---|---|---|---|
| HT | 0 | HT CONTROL MODULE | | AC CONSTRAINT | RDG/MORE PPDU |
| VHT | 1 | 0 | VHT CONTROL MODULE | AC CONSTRAINT | RDG/MORE PPDU |
| HE | 1 | 1 | A-CONTROL | | |

FIG. 8

| | B1-B15 | B16-B17 | B18-B19 | B20-B21 | B22-B23 | B24 | B25-B28 | B29 |
|---|---|---|---|---|---|---|---|---|
| HT | LINK ADAPTATION CONTROL | CALIBRATION POSITION | CALIBRATION SEQUENCE | RESERVED | CSI/STEERING | HT NDP ANNOUNCE. | RESERVED | DEI |

| VHT | MRQ | MSI/STBC | MFSI/GID-L | MFB | GID-H | CODING TYPE | FB Tx TYPE | UNSOLICITED MFB |
|---|---|---|---|---|---|---|---|---|
| | B2 | B3-B5 | B6-B8 | B9-B23 | B24-B26 | B27 | B28 | B29 |

| HE CONTROL ID | MEANING |
| --- | --- |
| 0 | TRIGGER RESPONSE SCHEDULING |
| 1 | OPERATING MODE (OM) |
| 2 | HE LINK ADAPTATION (HLA) |
| 3 | BUFFER STATUS REPORT (BSR) |
| 4 | UL POWER HEADROOM (UPH) |
| 5 | BANDWIDTH QUERY REPORT (BQR) |
| 6 | COMMAND AND STATUS (CAS) |
| 7-14 | RESERVED |
| 15 | ONES NEED EXPANSION SURELY (ONES) |

FIG. 11

PROTECTED HIGH-THROUGHPUT CONTROL SUBFIELD

CROSS-REFERENCE TO RELATED APPLICATION

This application claims the benefit of U.S. Provisional Application No. 63/104,883, entitled "Protected High-Throughput Control Subfield," by Jinjing Jiang, et al., filed Oct. 23, 2020, the contents of which are hereby incorporated by reference.

FIELD

The described embodiments relate, generally, to wireless communications among electronic devices, including techniques for protecting a high-throughput (HT) control subfield in a media access control (MAC) header in a frame communicated in a wireless local area network (WLAN).

BACKGROUND

Many electronic devices communicate with each other using wireless local area networks (WLANs), such as those based on a communication protocol that is compatible with an Institute of Electrical and Electronics Engineers (IEEE) standard, such as an IEEE 802.11 standard (which is sometimes referred to as 'Wi-Fi'). During communication in a WLAN using a communication protocol that is compatible with an IEEE 802.11 standard, a transmitter may convey information to a receiver in a high-throughput (HT) control subfield in a MAC header in a frame. The HT control subfield for IEEE 802.11n, the very high-throughput (VHT) variant HT control subfield for IEEE 802.11ac or the high-efficiency (HE) variant HT control subfield for IEEE 802.11ax is 32-bit long. In IEEE 802.11n and IEEE 802.11ac, the HT/VHT control subfield is mainly used for fast link adaptation purpose, while in IEEE 802.11ax the HE variant HT control subfield (which is sometimes referred to as an 'Aggregate control subfield' or 'A-control subfield') is redefined to be able to carry multiple types of control information. Inside the A-control subfield, the high-efficiency control identifier is used to identify different type of control information. In the discussion that follows, an HE control subfield or an A-control subfield are referred to as an 'A-control subfield."

However, the varieties of information contained in the IEEE 802.11ax A-control subfield may raise security and/or privacy concerns. These security and privacy concerns may be compounded by additional information that may be added in future standards.

SUMMARY

In a first group of embodiments, an electronic device that provides a frame is described. This electronic device includes: an antenna node that can communicatively couple to an antenna; and an interface circuit that communicates with a second electronic device. During operation, the interface circuit optionally encrypts an A-control subfield that includes control information for one or more features associated with a wireless communication protocol. Then, the interface circuit provides a frame addressed to the second electronic device, where the frame includes a MAC header and the MAC header includes the A-control subfield that is encrypted.

Note that the encrypted A-control subfield may be jointly encrypted with data in a payload in the frame. Moreover, the encrypted A-control subfield may be separated from the payload in the frame by one or more additional subfields. Alternatively, the encrypted A-control subfield may be adjacent to the payload in the frame.

Furthermore, the MAC header may include an indicator that indicates whether the A-control subfield is encrypted. For example, the MAC header may include a counter mode cipher block chaining (CBC)-MAC protocol (CCMP) header, and the CCMP header may include the indicator.

Additionally, the frame may include a preamble that indicates whether the A-control subfield is encrypted.

In some embodiments, the MAC header may include an encrypted quality-of-service (QoS) subfield. Moreover, when an updated A-control subfield is carried in a QoS null frame, the QoS null frame may use a separate sequence-number space from a sequence-number space of the frame. Note that sequence numbers in QoS null frames may increase monotonically.

Furthermore, the frame may be compatible with an IEEE 802.11be standard or an IEEE 802.11 standard subsequent to IEEE 802.11be.

Additionally, the frame may include packet-extension padding, such as when the decryption of A-Control needs additional processing time.

In some embodiments, when retransmitting the frame, the interface circuit may exclude an update to the A-control subfield.

Moreover, the frame may include a preamble and, when the frame is retransmitted, the preamble may include an indication that the A-control subfield is valid. Alternatively, when the frame is retransmitted, the MAC header may include an indication that the A-control subfield is valid. Note that the indication may be protected using additional association data (AAD).

Furthermore, the interface circuit may aggregate the frame with one or more retransmitted frames that include different A-control subfields in an aggregated-MAC protocol data unit (A-MPDU).

Other embodiments provide the second electronic device that performs counterpart operations to at least some of the operations performed by the electronic device. For example, the second electronic device may include a second interface circuit. During operation, the second interface circuit may receive a frame addressed to the second electronic device, where the frame includes a MAC header and the MAC header includes an A-control subfield that is encrypted. Then, the second interface circuit may optionally decrypt the A-control subfield.

Note that, when the frame is a retransmission, the second interface circuit may discard the A-control subfield when the A-control subfield of other frames aggregated with the retransmitted frame includes an update to the A-control subfield.

Other embodiments provide an integrated circuit (which is sometimes referred to as a 'communication circuit') for use with the electronic device or the second electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

In a second group of embodiments, an electronic device that provides a frame is described. This electronic device includes: an antenna node that can communicatively couple to an antenna; and an interface circuit that communicates with a second electronic device. During operation, the interface circuit optionally performs an integrity check associated with at least a portion of a frame based at least in part on an A-control subfield. Then, the interface circuit provides the frame addressed to the second electronic device, where the frame includes a MAC header and the MAC header includes the A-control subfield that is an input to the integrity check.

Note that the integrity check may include additional association data (AAD).

Other embodiments provide the second electronic device that performs counterpart operations to at least some of the operations performed by the electronic device. For example, the second electronic device may include a second interface circuit. During operation, the second interface circuit may receive a frame addressed to a second electronic device, where the frame includes a MAC header and the MAC header includes an A-control subfield that is an input to an integrity check. Then, the second interface circuit may optionally perform the integrity check based at least in part on the A-control subfield.

Other embodiments provide an integrated circuit (which is sometimes referred to as a 'communication circuit') for use with the electronic device or the second electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 8 illustrates an example of control subfields in different media access control (MAC) headers according to some embodiments of the disclosure.

FIG. 9 illustrates an example of a high throughput (HT) control subfield in a MAC header according to some embodiments of the disclosure.

FIG. 10 illustrates an example of a very high throughput (VHT) control subfield in a MAC header according to some embodiments of the disclosure.

FIG. 11 illustrates an example of values of a high-efficiency (HE) control identifier in an HE-variant HT control subfield in a MAC header according to some embodiments of the disclosure.

Note that like reference numerals refer to corresponding parts throughout the drawings. Moreover, multiple instances of the same part are designated by a common prefix separated from an instance number by a dash.

DETAILED DESCRIPTION

Figure 1:
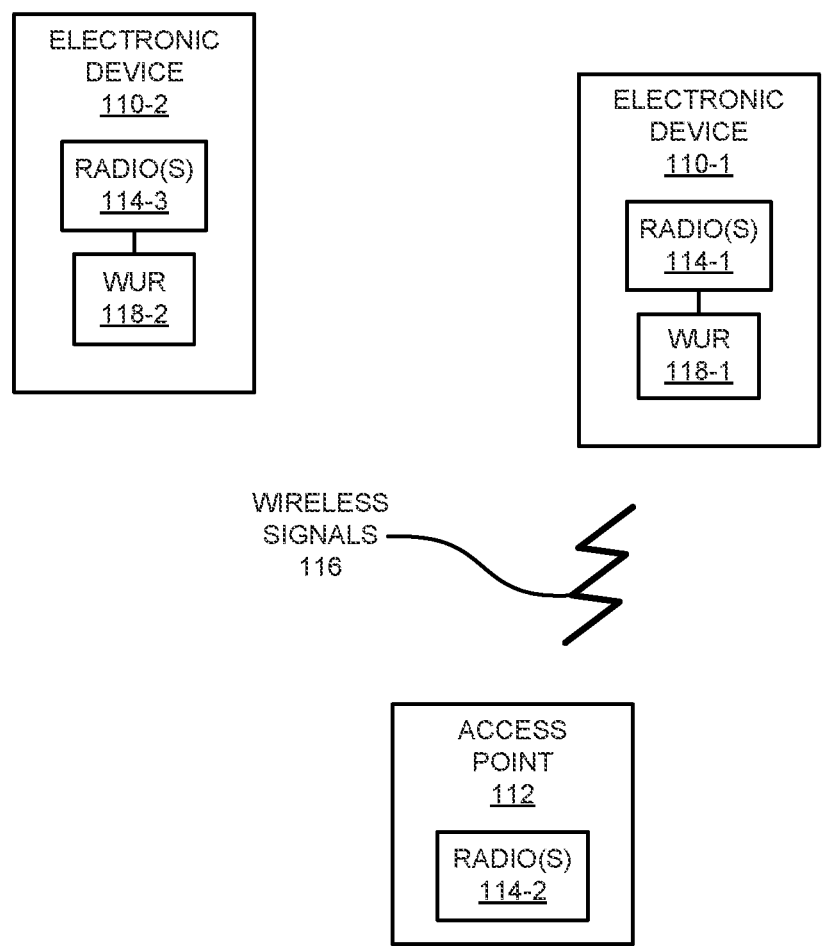
FIG. 1 illustrates an example network environment for communication between electronic devices according to some embodiments of the disclosure.

Some embodiments include an electronic device that provides a frame. During operation, the electronic device may encrypt an A-control subfield. Then, the electronic device may provide the frame addressed to a second electronic device, where the frame includes a MAC header and the MAC header includes the A-control subfield that is encrypted. Note that the encrypted A-control subfield may be jointly encrypted with data in a payload in the frame. Moreover, the encrypted A-control subfield may be separated from the payload in the frame by one or more additional subfields or may be adjacent to the payload in the frame. Furthermore, the MAC header may include an indicator that indicates whether the A-control subfield is encrypted. Additionally, the frame may include a preamble that indicates whether the A-control subfield is encrypted. The frame may be received by the second electronic device. After receiving the frame, the second electronic device may decrypt the A-control subfield.

In some embodiments, the electronic device may perform an integrity check associated with at least a portion of a frame based at least in part on an A-control subfield. Then, the electronic device may provide the frame addressed to the second electronic device, where the frame includes a MAC header and the MAC header includes the A-control subfield that is an input to the integrity check. Note that the integrity check may include AAD. The frame may be received by the second electronic device. After receiving the frame, the second electronic device may perform the integrity check based at least in part on the A-control subfield.

By communicating the frame, these communication techniques may improve security and/or privacy of the information included in the frame. Consequently, the communication techniques may prevent viewing or modification of the information by unintended recipients. These capabilities may enhance trust in the communication techniques, and may improve the user experience and customer satisfaction when using the electronic device and/or the second electronic device.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11be, which is used as an illustrative example in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have one or more connections with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 15:
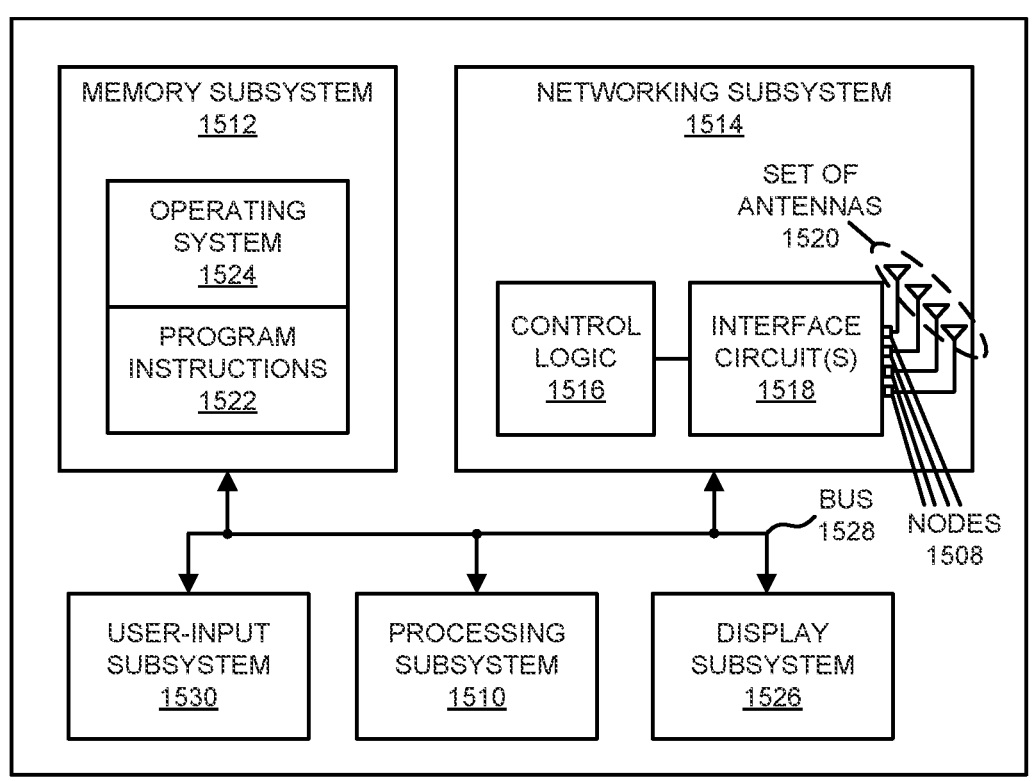
FIG. 15 illustrates an example of an electronic device of FIG. 1 according to some embodiments of the disclosure.

As described further below with reference to FIG. 15, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-14, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

As discussed previously, information in control subfields in existing IEEE 802.11 standards may raise security and/or privacy concerns. These security and privacy concerns may be compounded by additional information (such as additional control identifiers) that may be added in future standards.

In order to address these challenges, as described below with reference to FIGS. 2-14, in some embodiments of the disclosed communication techniques a frame may be communicated between two or more electronic devices in the WLAN, such as between access point 112 and electronic device 110-1 or between electronic device 110-1 and electronic device 110-2. Using access point 112 and electronic device 110-1 as an illustrative example, access point 112 may optionally encrypt an A-control subfield and provide a frame that includes the encrypted A-control subfield to electronic device 110-1. After receiving the frame, electronic device 110-1 may extract the encrypted A-control subfield and may optionally decrypt the encrypted A-control subfield.

Alternatively or additionally, access point 112 may optionally perform an integrity check associated with at least a portion of a frame based at least in part on an A-control subfield. Note that the integrity check may include AAD.

Then, access point 112 may provide a frame that includes the A-control subfield to electronic device 110-1. After receiving the frame, electronic device 110-1 may extract the A-control subfield and may optionally perform a second integrity check associated with at least a portion of the frame based at least in part on the A-control subfield. Note that the second integrity check may include AAD.

In some embodiments, electronic device 110-1 may perform a remedial action based at least in part on a result or an output of the second integrity check. For example, electronic device 110-1 may: set a flag associated with the frame, discard contents of the frame (such as a payload) and/or request retransmission of the frame by access point 112. Alternatively, based at least in part on the result or the output of the second integrity check (e.g., when the comparison indicates that the results or the outputs of the integrity check and the second integrity check are the same), electronic device 110-1 may proceed with normal processing of the frame (such as processing of a payload in the frame).

In summary, the communication techniques may improve security and/or privacy during communication between electronic devices in a WLAN. Notably, information in a MAC header may be encrypted and/or secured using an integrity check.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as OFDMA). For example, the one or more radios 114-2 may provide one or more trigger frames for the one or more electronic devices. Moreover, in response to receiving the one or more trigger frames, the one or more radios 114-1 may provide one or more group or block acknowledgments (BAs) to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110 and/or 112. Consequently, one of electronic devices 110 and/or 112 may perform operations in the communication techniques.

Figure 2:
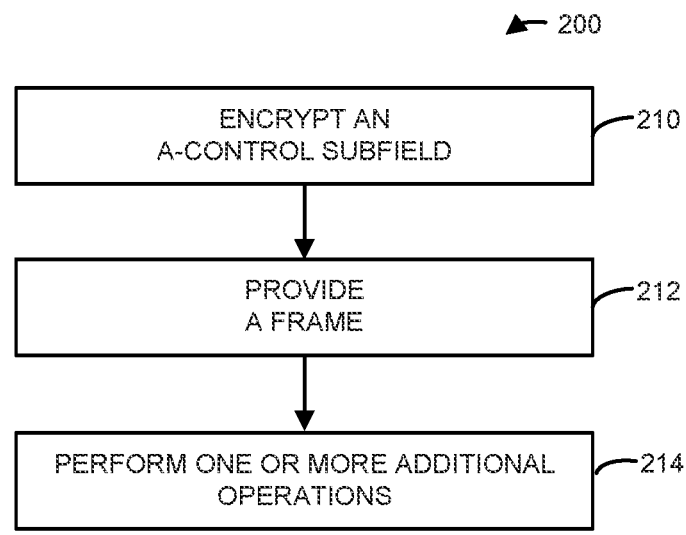
FIG. 2 illustrates an example method for providing a frame according to some embodiments of the disclosure.

FIG. 2 presents a flow diagram illustrating an example method 200 for providing a frame. This method may be performed by an electronic device, such as electronic device 110-1 or access point 112 in FIG. 1. Note that the communication with a second electronic device may be compatible with an IEEE 802.11 communication protocol.

During operation, the electronic device may optionally encrypt an A-control subfield (operation 210). Then, the electronic device may provide the frame (operation 212) addressed to the second electronic device, where the frame includes a MAC header and the MAC header includes the A-control subfield that is encrypted.

Note that the encrypted A-control subfield may be jointly encrypted with data in a payload in the frame. Moreover, the encrypted A-control subfield may be separated from the payload in the frame by one or more additional subfields. Alternatively, the encrypted A-control subfield may be adjacent to the payload in the frame.

Furthermore, the MAC header may include an indicator that indicates whether the A-control subfield is encrypted. For example, the MAC header may include a CCMP header, and the CCMP header may include the indicator. Additionally, the frame may include a preamble that indicates whether the A-control subfield is encrypted.

In some embodiments, the MAC header may include an encrypted QoS subfield. Moreover, when an updated A-control subfield is carried in a QoS null frame, the QoS null frame may use a separate sequence-number space from a sequence-number space of the frame. Note that sequence numbers in QoS null frames may increase monotonically.

Furthermore, the frame may be compatible with an IEEE 802.11be standard or an IEEE 802.11 standard subsequent to IEEE 802.11be.

Additionally, the frame may include packet-extension padding.

In some embodiments, the electronic device optionally performs one or more additional operations (operation 214). For example, when retransmitting the frame, the electronic device may exclude an update to the A-control subfield.

Moreover, the frame may include a preamble and, when the frame is retransmitted, the preamble may include an indication that the A-control subfield is valid. Alternatively, when the frame is retransmitted, the MAC header may include an indication that the A-control subfield is valid. Note that the indication may be protected using AAD.

Furthermore, the electronic device may aggregate the frame with one or more retransmitted frames that include different A-control subfields in an A-MPDU.

Figure 3:
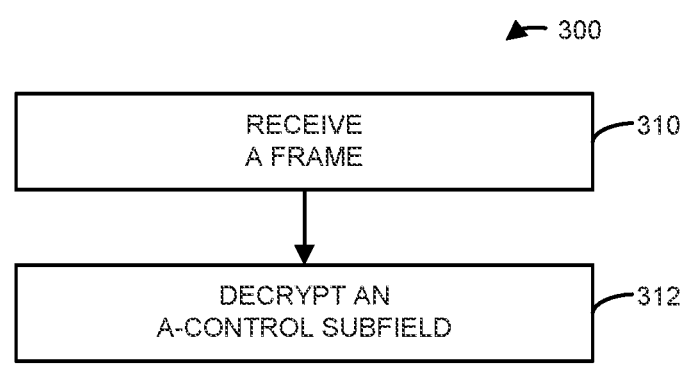
FIG. 3 illustrates an example method for receiving a frame according to some embodiments of the disclosure.

FIG. 3 presents a flow diagram illustrating an example method 300 for receiving a frame. This method may be performed by the second electronic device, such as electronic device 110-2 or access point 112 in FIG. 1. Note that the communication with the electronic device may be compatible with an IEEE 802.11 communication protocol.

During operation, the second electronic device may receive the frame (operation 310) addressed to the second electronic device, where the frame includes a MAC header and the MAC header includes an A-control subfield that is encrypted. Then, the second electronic device may optionally decrypt the A-control subfield (operation 312).

In some embodiments, the second electronic device optionally performs one or more additional operations (operation 314). For example, when the frame is a retransmission, the second electronic device may discard the A-control subfield when the A-control subfield of other frames aggregated with the retransmitted frame includes an update to the A-control subfield.

Figure 4:
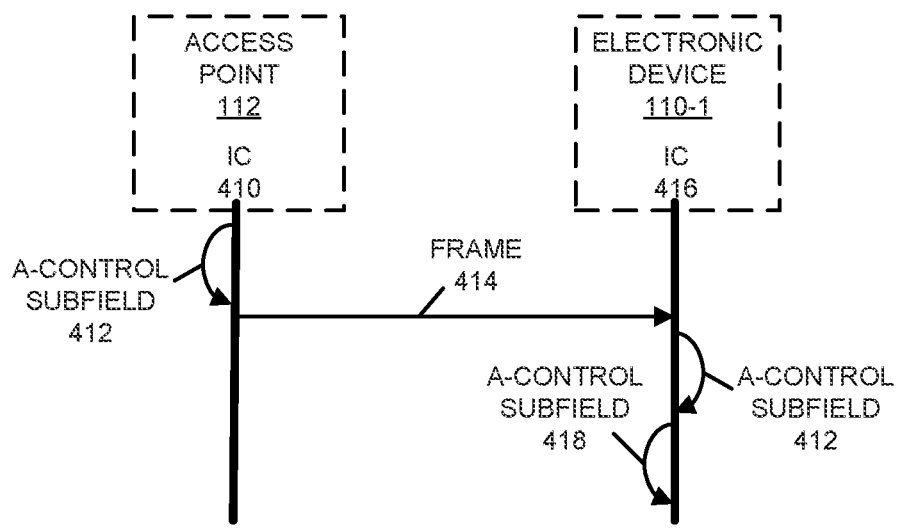
FIG. 4 illustrates an example of communication among components, e.g., in the electronic devices of FIG. 1 according to some embodiments of the disclosure.

The communication techniques are further illustrated in FIG. 4, which presents a flow diagram illustrating an example of communication among components in access point 112 and electronic device 110-1. During operation, an interface circuit (IC) 410 in access point 112 may encrypt an A-control subfield 412. Then, interface circuit 410 may generate a frame 414 that includes the encrypted A-control subfield 412, and may transmit frame 414 to electronic device 110-1.

After receiving frame 414, an interface circuit 416 in electronic device 110-1 may extract the encrypted A-control subfield 412. Then, interface circuit 416 may decrypt the encrypted A-control subfield 412 to recover A-control subfield 418.

Figure 5:
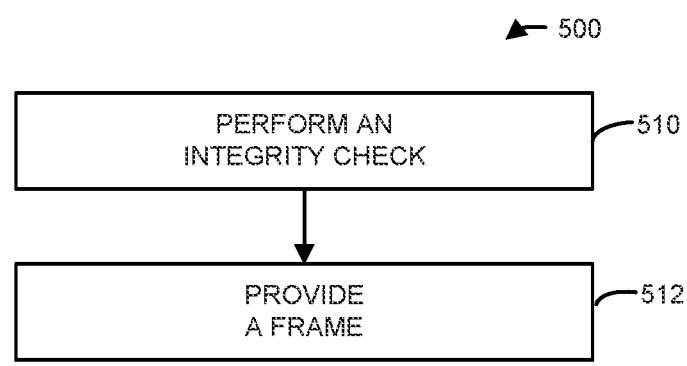
FIG. 5 illustrates an example method for providing a frame according to some embodiments of the disclosure.

FIG. 5 presents a flow diagram illustrating an example method 500 for providing a frame. This method may be performed by an electronic device, such as electronic device 110-1 or access point 112 in FIG. 1. Note that the communication with a second electronic device may be compatible with an IEEE 802.11 communication protocol.

During operation, the electronic device may optionally perform an integrity check (operation 510) associated with at least a portion of the frame based at least in part on an A-control subfield. Note that the integrity check may include AAD. Then, the electronic device may provide the frame (operation 512) addressed to the second electronic device, where the frame includes a MAC header and the MAC header includes the A-control subfield that is an input to the integrity check.

Figure 6:
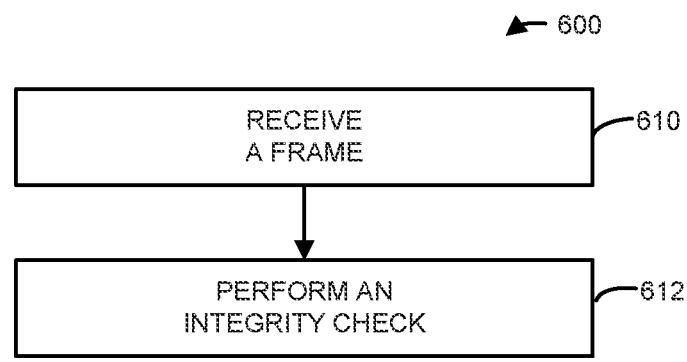
FIG. 6 illustrates an example method for receiving a frame according to some embodiments of the disclosure.

FIG. 6 presents a flow diagram illustrating an example method 600 for receiving a frame. This method may be performed by a second electronic device, such as electronic device 110-2 or access point 112 in FIG. 1. Note that the communication with an electronic device may be compatible with an IEEE 802.11 communication protocol.

During operation, the second electronic device may receive the frame (operation 610) addressed to a second electronic device, where the frame includes a MAC header and the MAC header includes an A-control subfield that is an input to an integrity check. Then, the second electronic device may optionally perform an integrity check (operation 612) based at least in part on the A-control subfield.

In some embodiments of method 200 (FIG. 2), 300 (FIG. 3), 500 (FIG. 5), and/or 600, as well as in some or all of the figures below, there may be additional or fewer operations. Further, one or more different operations may be included. Moreover, the order of the operations may be changed, and/or two or more operations may be combined into a single operation or performed at least partially in parallel.

Figure 7:
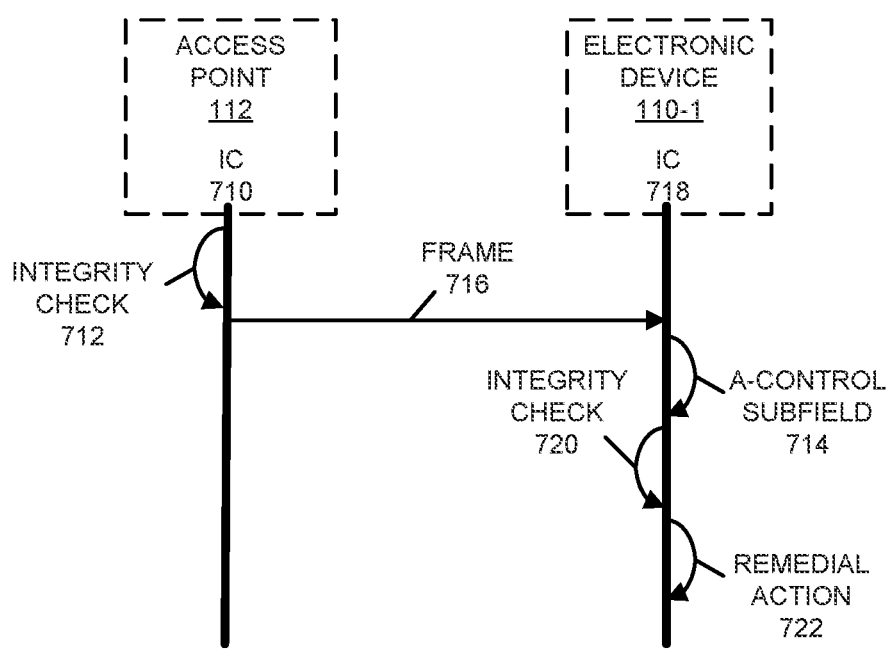
FIG. 7 illustrates an example of communication among components, e.g., in the electronic devices of FIG. 1 according to some embodiments of the disclosure.

The communication techniques are further illustrated in FIG. 7, which presents a flow diagram illustrating an example of communication among components in access point 112 and electronic device 110-1. During operation, an interface circuit (IC) 710 in access point 112 may perform an integrity check 712 based at least in part on an A-control subfield 714 (e.g., integrity check 712 may use A-control subfield 714 as an input). Then, interface circuit 710 may generate a frame 716 that includes A-control subfield 714, and may transmit frame 716 to electronic device 110-1. Note that frame 716 may optionally include a result or an output of integrity check 712.

After receiving frame 716, an interface circuit 718 in electronic device 110-1 may extract A-control subfield 714. Then, interface circuit 718 may perform an integrity check 720 based at least in part on A-control subfield 714 (e.g., integrity check 720 may use A-control subfield 714 as an input). Next, based at least in part on a result or an output of integrity check 720 and optionally the result or the output of integrity check 712 (e.g., based at least in part on a comparison of the result or the output of integrity check 720 and optionally the result or the output of integrity check 712), interface circuit 718 may perform a remedial action 722. For example, interface circuit 718 may: set a flag associated with frame 716, discard contents of frame 716 and/or request retransmission of frame 716. Alternatively, based at least in part on the result or the output of integrity check 720 (e.g., when the comparison indicates that the results or the outputs of integrity check 712 and integrity check 720 are the same), electronic device 110-1 may proceed with normal processing of frame 716 (such as processing of a payload in frame 716).

While communication between the components in FIGS. 4 and 7 are illustrated with unilateral or bilateral communication (e.g., lines having a single arrow or dual arrows), in general a given communication operation may be unilateral or bilateral.

We now further discuss the communication techniques. FIGS. 8-11 summarize control subfield formats and contents. Notably, FIG. 8 presents an example of control subfields in different MAC headers, FIG. 9 presents an example of an HT control subfield in a MAC header, FIG. 10 presents an example of a VHT control subfield in a MAC header, and FIG. 11 presents an example of values of an HE control identifier in an HE-variant HT control subfield in a MAC header.

Currently, the HT and VHT control subfields are not encrypted or integrity protected. For example, the AAD does not include the duration/identifier field or the HT control subfield. This is because the contents of these fields or subfields may change during normal operation (such as because of a rate change preceding retransmission). The HT control subfield may also be inserted or removed during normal operation, such as during retransmission of an aggregated MAC protocol data unit or A-MPDU, where the original A-MPDU included a modulation coding scheme request (MRQ) that has already generated a response.

However, there are security and privacy concerns on the new varieties of information contained in the IEEE 802.11ax A-control subfield. Moreover, new control identifiers may be added in future standards. Furthermore, the privacy problem may also occur with the QoS control subfield, which is included in the MAC header before the HT control subfield, and which includes the traffic identifier, the frame and the buffer size at the transmitter. Consequently, in some embodiments, the disclosed communication techniques may be used with other subfields, such as: the QoS control subfield, an address field or a sequence number (SN) field.

When one or more control subfield(s) are not secured, communication in a WLAN may be vulnerable to security attacks. For example, in an operating mode indication (OMI) A-control subfield attack, an attacker may record a failed transmission or a blocked transmission with OMI A-control subfield from a station or client (which is sometimes referred to as a 'recipient electronic device') to an access point when the access point did not return an acknowledgement frame. The attacker may replace the true OMI A-control subfield from the recorded failed transmission and replay the modified frame to the access point before the station can access the channel again. Consequently, the access point may adopt the wrong OMI A-control subfield, so that subsequent downlink (DL) transmissions to the station may fail multiple times until the station is able to notify the access point. Moreover, in a buffer status report attack, an attacker may replay a modified buffer status report to indicate '0' or an empty buffer, so that the station does not receive any trigger frames (or transmit opportunities) from the access point.

Alternatively, when the one or more control subfield(s) are not secured, communication in a WLAN may be vulnerable to privacy attacks. For example, in another type of buffer status report attack, a tracker may analyze the statistics of buffer status report to determine traffic pattern information that a station is generating. This traffic pattern information may allow the application types that a user is used to be inferred. For example, an access category index (ACI) High and QueueSize High in a buffer status report (BSR) A-control subfield may indicate from the station side what kind of traffic has the heaviest load. This may allow a tracker to send designated video streaming advertisements when they determine that a station has a high consumption of downlink video traffic.

Figure 12:
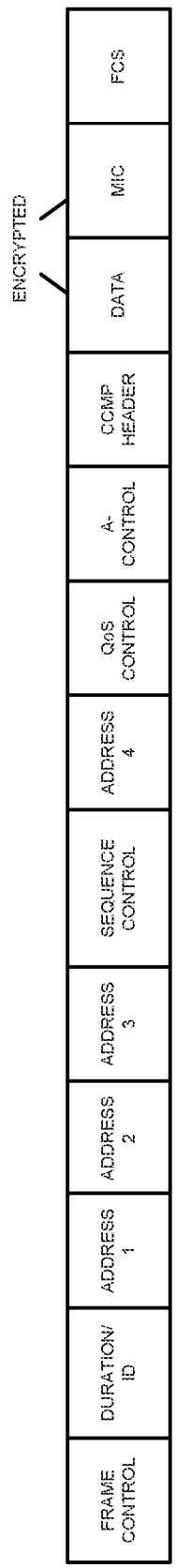
FIGS. 12-14 illustrate examples of an A-control subfield according to some embodiments of the disclosure.
Figure 13:
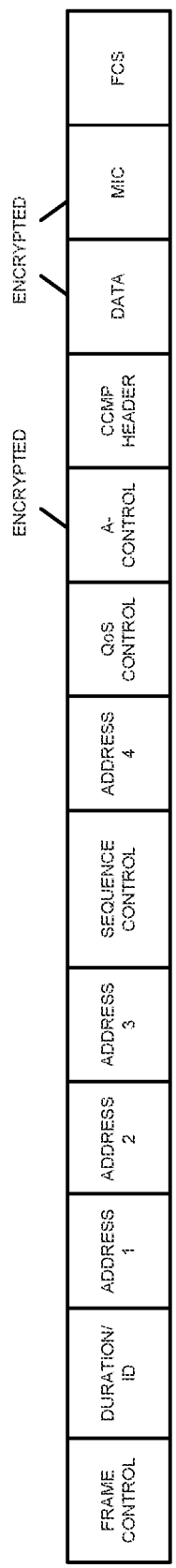
Figure 14:
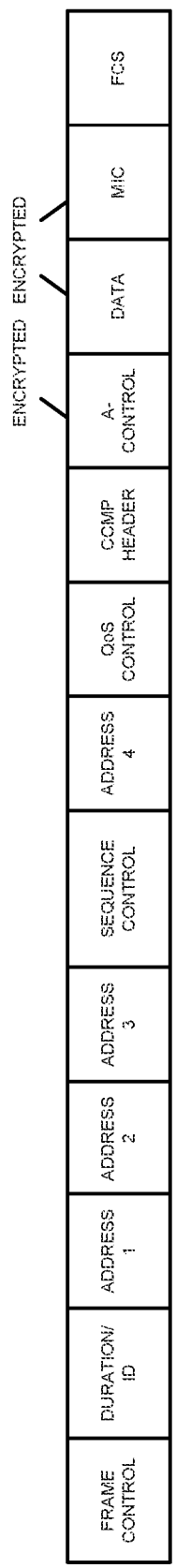

As shown in FIGS. 12-14, in some embodiments of the communication techniques, the A-control subfield may be protected using encryption. Notably, relative to an unencrypted A-control subfield (which is shown in FIG. 12), there may be different formats of the encrypted A-control subfield (as shown in FIGS. 13 and 14). For example, authenticate encryption (such as the counter mode cipher block chaining (CBC)-MAC protocol or CCMP, which is also referred to as AES CCMP, or the Galois counter mode protocol or GCMP) may be performed on the A-control subfield in the MAC service data unit (MSDU). (However, these encryption techniques are used as an illustration and, in other embodiments, a wide variety of other or additional encryption techniques may be used.) In some embodiments, the A-control subfield is encrypted with the payload data.

There may be different options for where the encrypted A-control subfield is placed. For example, the encrypted A-control subfield may be separated from the encrypted payload by the CCMP header. Alternatively, the encrypted A-control subfield may be placed immediately adjacent to the encrypted payload, such as in a common encrypted block.

Note that that if the A-control subfield is encrypted, the receiving extremely high-throughput (EHT) station may need to perform decryption for a plain 8-byte A-control subfield, and then may send it to the processing engine for the A-control subfield.

Additionally, typically there is a need for backwards compatibility with so-called legacy electronic devices that are compatible with an earlier IEEE 802.11 standard(s). This raises a concern as to how a station will know whether it needs to decrypt the A-control subfield. In some embodiments, EHT stations (e.g., in IEEE 802.11be) may always encrypt the A-control subfield, such as in an EHT physical layer protocol data unit (PPDU), or in a legacy PPDU format if the receiver-transmitter address pair indicates the PPDU is between EHT stations.

Alternatively, the A-control subfield may be optionally encrypted. In these embodiments, the header may include an indication that the A-control subfield is encrypted. For example, one bit in the EHT preamble may indicate or signal whether the A-control subfield is encrypted, or a reserved bit in the CCMP header may indicate that the A-control subfield is encrypted. However, if the CCMP header is not protected, it could be exploited by an attacker.

Another concern is that there may be a bit delay in retrieving the information contained in A-control subfield. This may be problematic because there should be minimal delay in processing this information. If more turn-around time is needed (e.g., because of stringent A-control subfield processing constraints), packet-extension (PE) padding may be used to provide more time for the receiver to decrypt the A-control subfield.

Moreover, there may be a problem if an encrypted A-control subfield needs to be updated (or removed) during retransmission. Notably, in these circumstances the AAD may be changed, so a transmitter cannot encrypt the A-control subfield again using the same nonce. Instead, a new packet number (PN) is needed. But then the retransmission may fail the replay check, because it may have a smaller sequence number, but a larger packet number.

In order to address this problem, the transmitter may not allow an A-control subfield update in retransmitted MPDUs. Instead, only new MPDUs may have an updated A-control subfield. Additionally, the A-control subfields in an A-MPDU may have different contents. Consequently, new MPDUs with updated A-control subfields may be aggregated with the retransmitted MPDUs.

Furthermore, there may be different options or embodiments for the receiver. Notably, the receiver may discard the A-control subfield in any retransmitted MPDU. Alternatively, there may be an indication of the validity of the A-control subfield in the transmitted MPDUs. For example, this indication may be provided by a bit in the preamble or the MAC header. Note that if the indication is included in the MAC Header, then it may be AAD protected.

Additionally, other problems may occur with an updated A-control subfield during retransmission. For example, QoS data MPDUs may run out, so that no new QoS data MPDUs are available to update the A-control subfield. In this case, one solution may use QoS null frame to carry the new A-control subfield. Notably, currently a sequence number for a QoS null frame is assigned arbitrarily. Consequently, encrypting the A-control subfield in a QoS null frame may cause a replay check failure. Therefore, QoS null frames may not be protected. This problem may be addressed by using a separate sequence-number space for QoS null frames. In this space, the sequence number may monotonically increase (as opposed to the current approach, where the sequence number is arbitrarily assigned), so that the QoS null frame can be encrypted. Alternatively, a new robust action or management frame may be defined. This new action frame may include the A-control subfield in its payload.

In some embodiments, if adding encryption of the A-control subfield is too challenging for a current implementation of the frame encryption flow, then only integrity checking for the A-control subfield may be used in some embodiments of the communication techniques. Notably, the A-control subfield may be part of the input for the AAD. Because an updated AAD may require a new packet number, the same or similar rules to those discussed previously for retransmission handling may be used. Alternatively, if the A-control subfield is carried in QoS null frames, the same or similar rules to those discussed previously for QoS null frames may be used.

Note that, in some embodiments of the communication techniques, a receiver may determine the frame format (such as HT, VHT or HE) based at least in part on a transmitter address and/or capabilities.

In summary, the disclosed communication techniques may secure information in an A-control subfield using encryption and/or an integrity check. These capabilities may improve the security and/or the privacy of communication in a WLAN.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 7 GHz frequency band, a 60 GHz frequency band, a Citizens Broadband Radio Service (CBRS) frequency band, a band of frequencies used by LTE, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 15 presents a block diagram of an electronic device 1500 (which may be a cellular telephone, a smartwatch, an access point, a wireless speaker, an IoT device, another electronic device, etc.) in accordance with some embodiments. This electronic device includes processing subsystem 1510, memory subsystem 1512 and networking subsystem 1514. Processing subsystem 1510 includes one or more devices configured to perform computational operations. For example, processing subsystem 1510 can include one or more microprocessors, application-specific integrated circuits (ASICs), microcontrollers, graphics processing units (GPUs), programmable-logic devices, and/or one or more digital signal processors (DSPs).

Memory subsystem 1512 includes one or more devices for storing data and/or instructions for processing subsystem 1510, and/or networking subsystem 1514. For example, memory subsystem 1512 can include dynamic random access memory (DRAM), static random access memory (SRAM), a read-only memory (ROM), flash memory, and/or other types of memory. In some embodiments, instructions for processing subsystem 1510 in memory subsystem 1512 include: program instructions or sets of instructions (such as program instructions 1522 or operating system 1524), which may be executed by processing subsystem 1510. For example, a ROM can store programs, utilities or processes to be executed in a non-volatile manner, and DRAM can provide volatile data storage, and may store instructions related to the operation of electronic device 1500. Note that the one or more computer programs may constitute a computer-program mechanism, a computer-readable storage medium or software. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510. In some embodiments, the one or more computer programs are distributed over a network-coupled computer system so that the one or more computer programs are stored and executed in a distributed manner.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations), such as: control logic 1516, one or more interface circuits 1518 and a set of antennas 1520 (or antenna elements) in an adaptive array that can be selectively turned on and/or off by control logic 1516 to create a variety of optional antenna patterns or 'beam patterns.' Alternatively, instead of the set of antennas, in some embodiments electronic device 1500 includes one or more nodes 1508, e.g., a pad or a connector, which can be coupled to the set of antennas 1520. Thus, electronic device 1500 may or may not include the set of antennas 1520. For example, networking subsystem 1514 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fix networking system), an Ethernet networking system, and/or another networking system.

In some embodiments, networking subsystem 1514 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or frame frames and/or scanning for advertising frames transmitted by other electronic devices.

Within electronic device 1500, processing subsystem 1510, memory subsystem 1512 and networking subsystem 1514 are coupled together using bus 1528 that facilitates data transfer between these components. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/or electro-optical connections among the subsystems.

In some embodiments, electronic device 1500 includes a display subsystem 1526 for displaying information on a display, which may include a display driver and the display, such as a liquid-crystal display, a multi-touch touchscreen, etc. Display subsystem 1526 may be controlled by processing subsystem 1510 to display information to a user (e.g., information relating to incoming, outgoing, or an active communication session).

Electronic device 1500 can also include a user-input subsystem 1530 that allows a user of the electronic device 1500 to interact with electronic device 1500. For example, user-input subsystem 1530 can take a variety of forms, such as: a button, keypad, dial, touch screen, audio input interface, visual/image capture input interface, input in the form of sensor data, etc.

Electronic device 1500 can be (or can be included in) any electronic device with at least one network interface. For example, electronic device 1500 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems.

Additionally, one or more of the subsystems may not be present in electronic device 1500. Moreover, in some embodiments, electronic device 1500 may include one or more additional subsystems that are not shown in FIG. 15. In some embodiments, electronic device may include an analysis subsystem that performs at least some of the operations in the communication techniques. Also, although separate subsystems are shown in FIG. 15, in some embodiments some or all of a given subsystem or component can be integrated into one or more of the other subsystems or component(s) in electronic device 1500. For example, in some embodiments program instructions 1522 are included in operating system 1524 and/or control logic 1516 is included in the one or more interface circuits 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1514. This integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1522, operating system 1524 (such as a driver for an interface circuit in networking subsystem 1514) or in firmware in an interface circuit networking subsystem 1514. Alternatively or additionally, at least some of the operations in the communication techniques may be implemented in a physical layer, such as hardware in an interface circuit in networking subsystem 1514. In some embodiments, the communication techniques are implemented, at least in part, in a MAC layer and/or in a physical layer in an interface circuit in networking subsystem 1514.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna node configured to communicatively couple to an antenna; and
   an interface circuit, communicatively coupled to the antenna node, configured to communicate with a second electronic device, wherein the interface circuit is configured to:
   provide, from the interface circuit, a frame addressed to the second electronic device, wherein the frame comprises a media access control (MAC) header including an encrypted Aggregate (A)-control subfield that includes control information for one or more features associated with a wireless communication protocol,
   wherein the frame comprises packet-extension padding based at least in part on a processing time associated with the encrypted A-control subfield, the processing time includes a decryption time for decrypting the encrypted A-control subfield and the packet-extension padding increases an amount of time available to decrypt the encrypted A-control subfield, and
   wherein the A-control subfield is encrypted along with a payload and a message integrity code, the encrypted A-control subfield is separated from the encrypted payload by a counter mode cipher block chaining (CBC)-media access control (MAC) protocol (CCMP) header or the encrypted A-control subfield is immediately adjacent to the encrypted payload, and a bit in an extremely high throughput (EHT) preamble or a bit in the CCMP header indicates that the A-control subfield is encrypted.

2. The electronic device of claim 1, wherein the encrypted A-control subfield is jointly encrypted with data in a payload in the frame.

3. The electronic device of claim 2, wherein the encrypted A-control subfield is separated from the payload in the frame by one or more additional subfields.

4. The electronic device of claim 1, wherein the MAC header comprises an indicator that indicates whether the encrypted A-control subfield is encrypted.

5. The electronic device of claim 4, wherein the MAC header comprises a counter mode cipher block chaining (CBC)-MAC protocol (CCMP) header that comprises the indicator.

6. The electronic device of claim 1, wherein the frame comprises a preamble that indicates whether the encrypted A-control subfield is encrypted.

7. The electronic device of claim 1, wherein the MAC header comprises an encrypted quality-of-service (QOS) subfield.

8. The electronic device of claim 7, wherein, when an updated A-control subfield is carried in a QoS null frame that uses a separate sequence-number space from a sequence-number space of the frame.

9. The electronic device of claim 8, wherein sequence numbers in QoS null frames increase monotonically.

10. The electronic device of claim 1, wherein, when retransmitting the frame, the interface circuit is configured to exclude an update to the encrypted A-control subfield.

11. The electronic device of claim 1, wherein the frame comprises a preamble and, when the frame is retransmitted, the preamble comprises an indication that the encrypted A-control subfield is valid.

12. The electronic device of claim 1, wherein, when the frame is retransmitted, the MAC header comprises an indication that the encrypted A-control subfield is valid.

13. The electronic device of claim 12, wherein the indication is protected using additional association data (AAD).

14. The electronic device of claim 1, wherein the interface circuit is configured to aggregate the frame with one or more retransmitted frames that comprise different A-control subfields in an aggregated-MAC protocol data unit (A-MPDU).

15. A method for providing a frame from an electronic device, comprising:

encrypting an Aggregate (A)-control subfield that includes control information for one or more features associated with a wireless communication protocol; and providing the frame addressed to a second electronic device, wherein the frame comprises a media access control (MAC) header that comprises an encrypted A-control subfield, wherein the frame comprises packet-extension padding based at least in part on a processing time associated with the encrypted A-control subfield, the processing time includes a decryption time for decrypting the encrypted A-control subfield and the packet-extension padding increases an amount of time available to decrypt the encrypted A-control subfield, and wherein the A-control subfield is encrypted along with a payload and a message integrity code, the encrypted A-control subfield is separated from the encrypted payload by a counter mode cipher block chaining (CBC)-media access control (MAC) protocol (CCMP) header or the encrypted A-control subfield is immediately adjacent to the encrypted payload, and a bit in an extremely high throughput (EHT) preamble or a bit in the CCMP header indicates that the A-control subfield is encrypted.

16. The method of claim 15, wherein the encrypted A-control subfield is jointly encrypted with data in a payload in the frame.

17. The method of claim 15, wherein the frame comprises a preamble that indicates whether the encrypted A-control subfield is encrypted.

18. A processor of an electronic device, comprising:

circuitry communicatively coupled to an antenna node configured to receive signals from an antenna of the electronic device; and circuitry configured to decrypt an encrypted Aggregate (A)-control subfield, which includes control information for one or more features associated with a wireless communication protocol, received in a frame from a second electronic device, wherein the frame comprises a media access control (MAC) header that comprises the encrypted A-control subfield, wherein the frame comprises packet-extension padding based at least in part on a processing time associated with the encrypted A-control subfield, the processing time includes a decryption time for decrypting the encrypted A-control subfield and the packet-extension padding increases an amount of time available to decrypt the encrypted A-control subfield, and wherein the A-control subfield is encrypted along with a payload and a message integrity code, the encrypted A-control subfield is separated from the encrypted payload by a counter mode cipher block chaining (CBC)-media access control (MAC) protocol (CCMP) header or the encrypted A-control subfield is immediately adjacent to the encrypted payload, and a bit in an extremely high throughput (EHT) preamble or a bit in the CCMP header indicates that the A-control subfield is encrypted.

19. The electronic device of claim 18, wherein the frame comprises a preamble that indicates whether the encrypted A-control subfield is encrypted.

20. The electronic device of claim 18, wherein the frame is aggregated with one or more retransmitted frames that comprise different A-control subfields in an aggregated-MAC protocol data unit (A-MPDU).

* * * * *